(12) United States Patent
Whitehead et al.

(10) Patent No.: US 8,361,289 B2
(45) Date of Patent: Jan. 29, 2013

(54) DIAMOND ELECTRODE

(76) Inventors: Andrew John Whitehead, Surrey (GB); Christopher John Wort, Oxfordshire (GB); Geoffrey Alan Scarsbrook, Berkshire (GB); William Joseph Yost, Berkshsire (GB)

( * ) Notice: Subject to any disclaimer, the term of this patent is extended or adjusted under 35 U.S.C. 154(b) by 794 days.

(21) Appl. No.: 12/514,055

(22) PCT Filed: Nov. 9, 2007

(86) PCT No.: PCT/IB2007/054561
§ 371 (c)(1),
(2), (4) Date: Sep. 8, 2009

(87) PCT Pub. No.: WO2008/056336
PCT Pub. Date: May 15, 2008

(65) Prior Publication Data
US 2010/0006450 A1    Jan. 14, 2010

(30) Foreign Application Priority Data

Nov. 10, 2006  (GB) .................................. 0622482.8

(51) Int. Cl.
*C25B 11/12*    (2006.01)
(52) U.S. Cl. .................. 204/294; 204/252; 205/626
(58) Field of Classification Search .................. 204/294, 204/252; 205/626
See application file for complete search history.

(56) References Cited

U.S. PATENT DOCUMENTS

| 2008/0053840 A1 | 3/2008 | Arihara et al. |
| 2009/0301865 A1 | 12/2009 | Yoshida et al. |
| 2010/0032312 A1* | 2/2010 | Scarsbrook ................... 205/626 |

FOREIGN PATENT DOCUMENTS

| CA | 2 560 910 A1 | 10/2005 |
| CA | 2 599 846 A1 | 9/2006 |
| DE | 100 25 167 A1 | 12/2001 |
| DE | 20 2005 003 720 U1 | 8/2006 |
| EP | 0 822 269 A1 | 2/1998 |
| EP | 0 994 074 A2 | 9/2000 |
| EP | 1 229 149 A1 | 8/2002 |
| EP | 1 754 804 A1 | 2/2007 |
| JP | 2005-336607 A | 12/2005 |
| WO | 02/061181 A1 | 8/2002 |

(Continued)

OTHER PUBLICATIONS

International Search Report for PCT/IB2007/054561 dated Mar. 7, 2008 (3 pages).

(Continued)

*Primary Examiner* — Bruce Bell
(74) *Attorney, Agent, or Firm* — Bryan Cave LLP

(57) ABSTRACT

An electrode comprising an electrically conducting diamond plate wherein the diamond plate comprises at least one elongate aperture and having an aperture edge length per unit working area of the diamond plate of greater than about 4 mm/mm$^2$, electrolysis cells comprising such electrodes, methods of treating water using such electrolysis cells and a method of production of ozone are disclosed.

16 Claims, 8 Drawing Sheets

FOREIGN PATENT DOCUMENTS

| | | |
|---|---|---|
| WO | 03/052174 A2 | 6/2003 |
| WO | 2005/058761 A1 | 6/2005 |
| WO | 2005/095282 A1 | 10/2005 |
| WO | 2005/106079 A1 | 11/2005 |
| WO | 2006/092125 A2 | 9/2006 |
| WO | 2007/017976 A1 | 2/2007 |
| WO | 2007/060807 A1 | 5/2007 |

OTHER PUBLICATIONS

Arihara et al., "Application of Freestanding Perforated Diamond Electrodes for Efficient Ozone-Water Production", Electrochemical and Solid State Letters, 2006, pp. D17-D20, vol. 9(8).

UK Search Report for GB0622482.8 dated Jan. 30, 2007 (1 page).

* cited by examiner

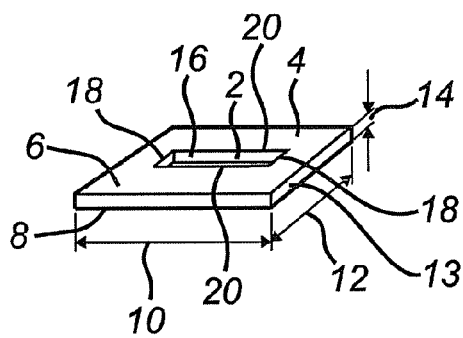
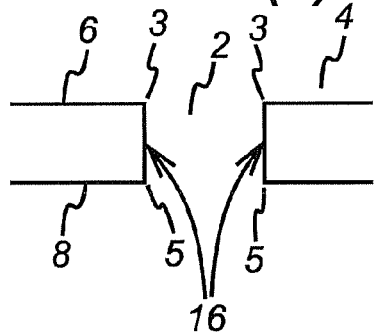
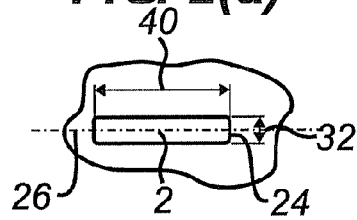
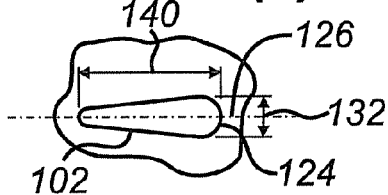
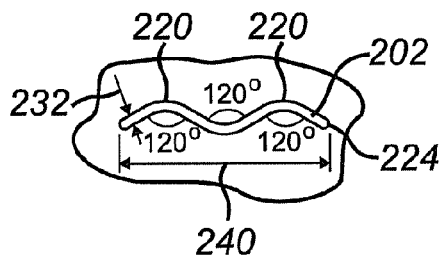
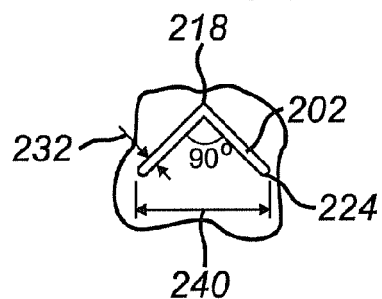
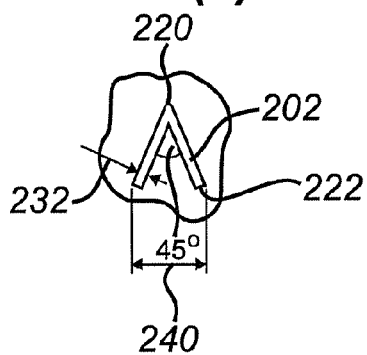
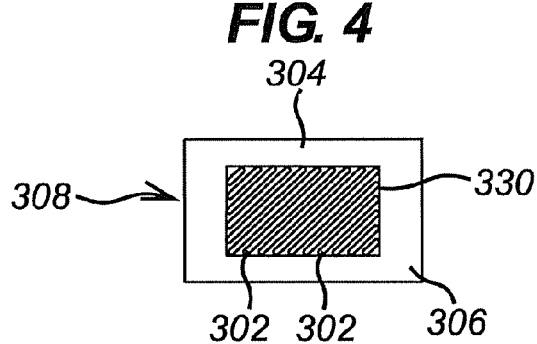

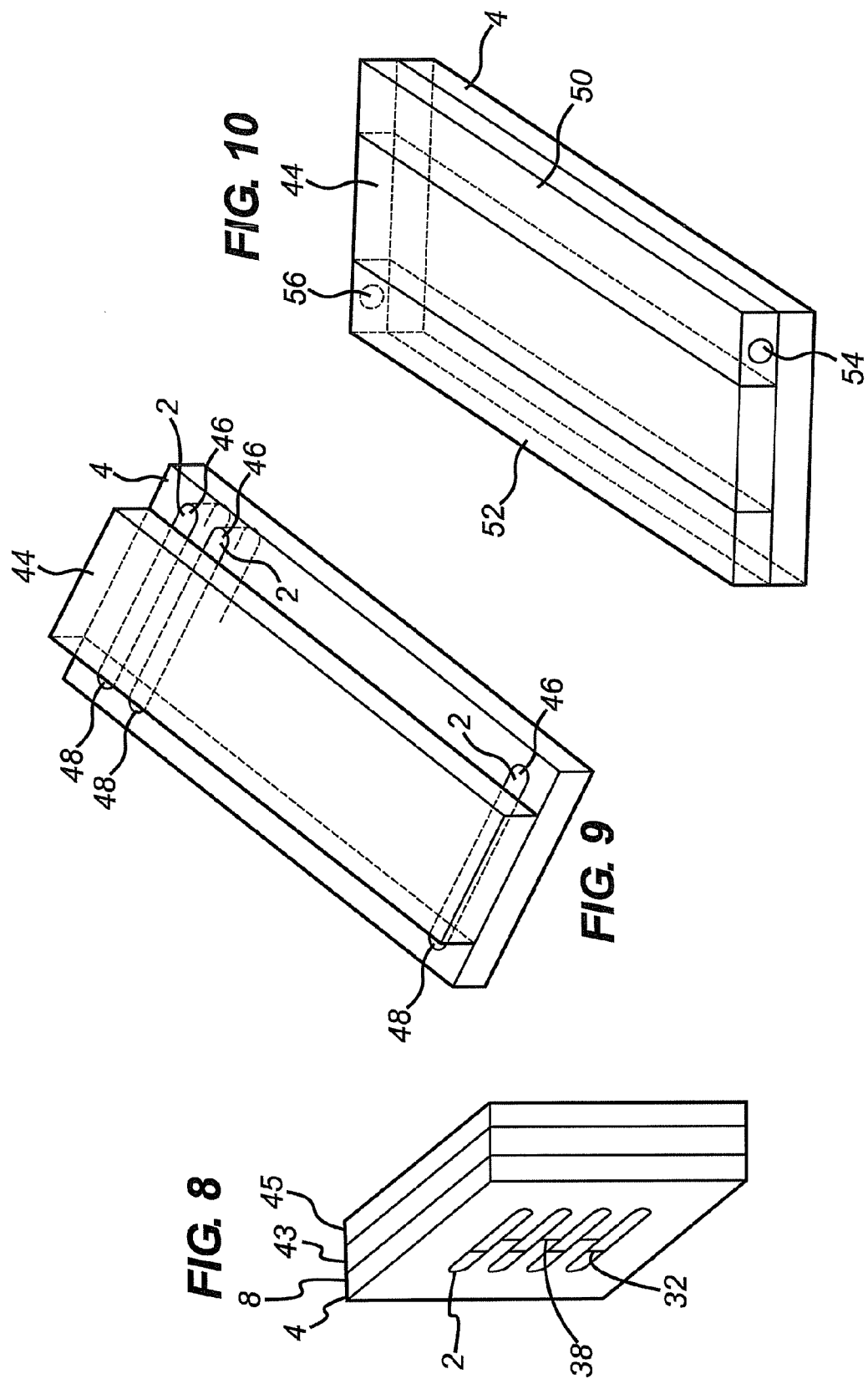

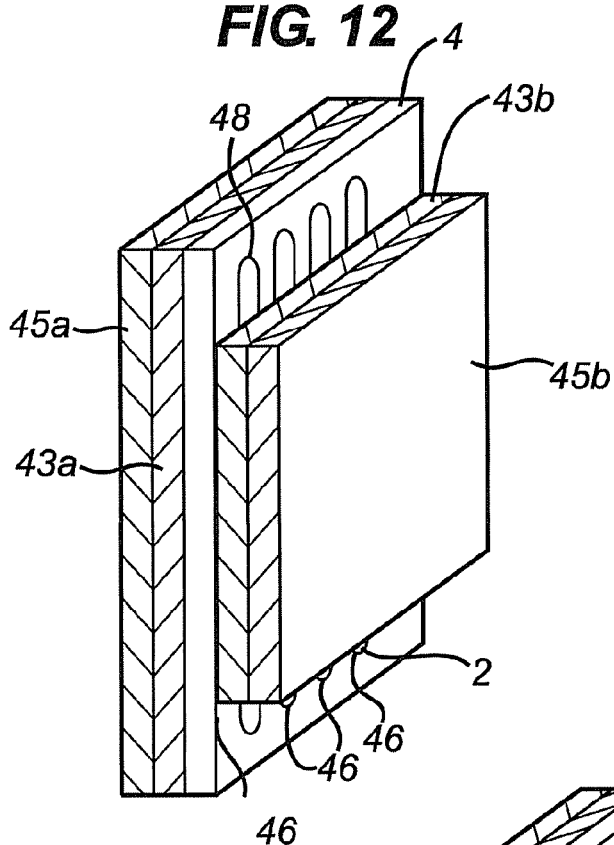
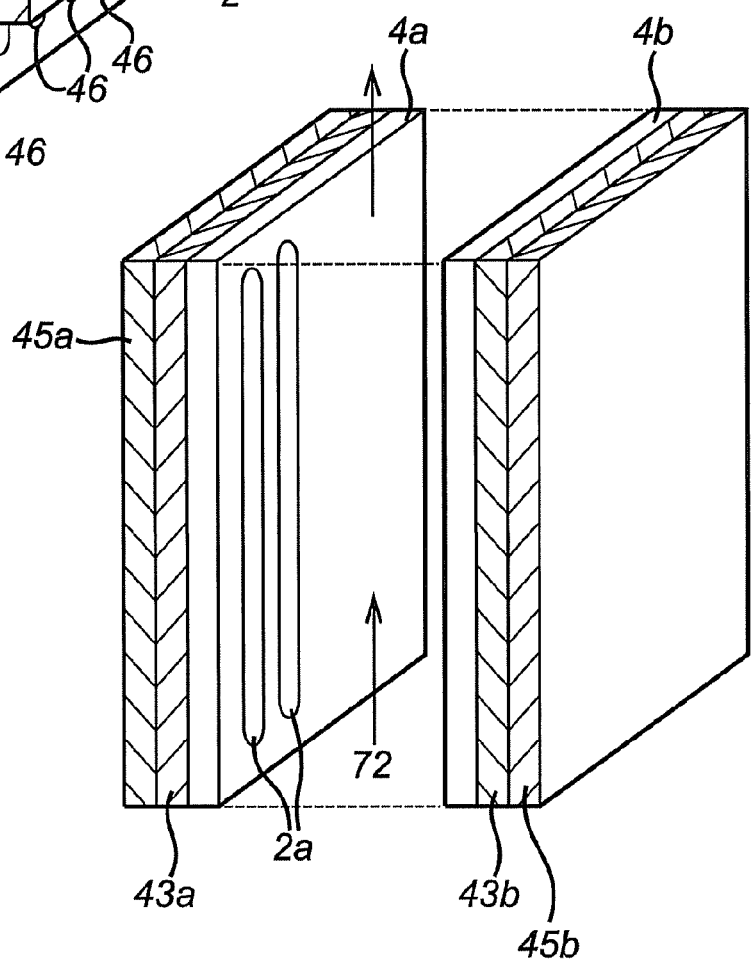

DIAMOND ELECTRODE

CROSS-REFERENCE TO RELATED APPLICATIONS

This application was filed under 35 U.S.C. §371 as a National Stage application of PCT International Application Serial No. PCT/IB2007/054561, filed Nov. 9, 2007. PCT International Application Serial No. PCT/IB2007/054561 claims priority to UK Patent Application GB 0 622 482.8, filed Nov. 10, 2006, which is incorporated herein by reference in its entirety.

FIELD OF THE INVENTION

The present invention relates to a diamond electrode, an electrolysis cell and a method for use of such in the treatment of water, in particular in the production of ozone by electrolysis of water.

All documents referred to herein are hereby incorporated by reference.

BACKGROUND OF THE INVENTION

Ozone has a very strong oxidising power. It is used in a number of fields including sterilisation, decolourisation and deodorisation. Electrolysis of water, preferably pure water, produces ozone through the following anode reaction:

$$3H_2O \rightarrow O_3 + 6H^+ + 6e^-$$

The ozone produced may be dissolved in water, so called ozone-water. Ozone-water has been used in sterilisation in fields such as food processing, sanitary facilities and medical services. Ozone sterilises by oxidation, which inhibits both organic and inorganic matter.

The use of ozone-water as a sterilising agent has a number of benefits including the release of non-toxic by-products, oxygen and water. In contrast, ethylene oxide, a common sterilisation agent for medical device sterilisation, is very toxic. Consequently, sterilisation with ethylene oxide requires a long aeration time.

It is conventional to use a $PbO_2$ anode for ozone generation. This anode material is subject to erosion under the application of very large current densities. In addition, it is undesirable to treat drinking and washing water with an electrode comprising lead. Diamond electrodes, in particular boron-doped diamond electrodes, are useful for electrochemical applications owing to a number of properties, which are significantly different to the properties of other electrode materials such as glassy carbon or platinum. These properties include the high hardness, high thermal conductivity and chemical inertness associated with diamond and the wide electrochemical potential window of conductive diamond.

DESCRIPTION OF RELATED ART

The use of a perforated conductive diamond electrode for ozone generation by electrolysis of water is described in Japanese Publication No. 2005-336607. Such electrodes comprise a diamond plate with circular apertures positioned adjacent to a proton exchange membrane (PEM). The electrode is pressed against the PEM, and the electrolysis process occurs primarily in the aperture of the electrode and specifically at the edges of the aperture adjacent to the PEM.

There are a number of disadvantages to the circular apertures of the prior art. The strength of a piece of diamond is decreased as apertures are cut; apertures that are more closely spaced reduce the strength of the diamond plate into which they are cut. Japanese Publication Number 2005-336607 discloses a minimum circular aperture separation of 0.2 mm.

In addition, a number of common cutting techniques, including the laser cutting techniques described in Japanese Publication Number 2005-336607, utilise a computer-numerically-controlled x-y table on which the diamond plate is mounted. The x-y table is moved by combining small steps in the x and y directions. This cutting method has a particular impact when cutting a curved shape in a diamond plate, e.g. for a circular aperture, in that the edge of each curve consists of a series of steps. Each of these steps can act as a stress concentrator, hereinafter called "stress concentration steps", and precipitate the failure of the diamond. The impact of this effect increases as the size of the apertures decreases. In addition, a further disadvantage when cutting circular apertures in a diamond plate is that the table must continually change orientation. These changes of orientation of the table result in the accumulation of errors causing either the pattern of circular apertures or the shape of individual apertures or both to be distorted.

When cutting large numbers of the small circular apertures, the cutting time per aperture decreases less rapidly than the aperture circumference, i.e. decreasing the circumference of a circular aperture does not result in a linear decrease in cutting time per aperture. Therefore, for every decrease in aperture circumference to allow for more apertures on an area of diamond, the higher the time per unit edge length of aperture produced. In addition, because the time between finishing cutting one aperture and starting the next is fixed, the amount of time wasted increases linearly with the number of apertures.

The object of the present invention is to provide a diamond electrode which can be used in the treatment of water and, in particular, produces a higher rate of ozone production, is easier to manufacture and less susceptible to breakage during normal use.

In a first aspect of the present invention, there is provided an electrode comprising an electrically conducting diamond plate comprising at least one elongate aperture and wherein the aperture edge length per unit working area of the diamond plate is greater than about 4 mm/mm².

SUMMARY OF THE INVENTION

An advantage of the electrode of the present invention is that the use of elongate aperture(s) provides a greater aperture edge length per unit working area of the diamond plate. When a diamond plate of the present invention is used in the electrolysis of water, the increase in edge length per unit working area of the diamond plate increases the rate of ozone production per unit working area of the diamond plate.

As used herein the "aperture edge length" refers to the total length of the perimeter of an elongate aperture as measured along the line of intersection between the aperture and either the front surface of the electrode or the back surface of the electrode.

The edge referred to in "aperture edge length" is the line formed by the intersection of the surface of the elongate aperture and either the front surface of the electrode or the back surface of the electrode. Where the electrode of the present invention is used in combination with a proton exchange membrane, this line is where, in use, the electrode of the present invention, the proton exchange membrane and fluid meet.

The term "working area" is used herein to refer to the area of the diamond plate into which the at least one elongate aperture is cut.

The lower average curvature of elongate apertures allows for a larger number of elongate apertures to be present in the diamond plate, thus increasing edge length per unit working area of the diamond plate, whilst retaining the minimum requirements for diamond plate strength. In addition, the reduction in the percentage of curved edge length and the concomitant increase in strength of the diamond plate allow for a smaller minimum aperture separation for elongate apertures in comparison to circular apertures. Therefore, a diamond plate comprising elongate apertures at their minimum separation can have a significantly greater aperture edge length per unit working area of the diamond plate than a diamond plate comprising circular apertures at their minimum separation. An increase in the aperture edge length per unit working area of the diamond plate increases the rate of the electrochemical reaction per unit working area of the diamond plate, which occurs along the edge length. In the case of the electrolysis of water, the increased edge length per unit working area of the diamond plate increases the rate of ozone production per unit working area of the diamond plate.

Fewer elongate apertures are required to produce a certain edge length per unit working area of the diamond plate compared to circular apertures. An advantage of having fewer apertures is that the diamond plate is stronger. This increase in strength allows for the use of thinner diamond plates in the manufacture of the electrodes and results in a reduction in the cost of the raw materials required.

When using elongate apertures, for a certain aperture edge length per unit working area of the diamond plate, the mean curvature per unit edge length is reduced relative to circular apertures. The increase in the mean curvature for circular apertures makes cutting a certain edge length of circular apertures more difficult than cutting the same edge length of elongate apertures. Therefore, a diamond plate comprising elongate apertures of the present invention is easier to manufacture. Furthermore, the lower percentage of curved edge length will increase the strength of the diamond plate due to the reduction of stress concentration steps.

A further advantage of the use of elongate apertures is a shorter manufacturing time per unit edge length cut compared to circular apertures. This is due to two factors, firstly the ease of cutting elongate apertures in comparison to circular apertures, due to the lower x-y table movement required, and secondly fewer elongate apertures are required to produce a certain edge length per unit working area. The smaller the number of apertures required, the lower the time that is wasted between finishing cutting one aperture and starting to cut the next.

Therefore, the elongate apertures in the diamond plate of the electrode of the present invention have numerous advantages over the circular apertures of the prior art.

The electrically conducting diamond plate may be generated by any method known in the art, but is preferably produced by the addition of dopant elements, e.g. lithium, beryllium, nitrogen, phosphorous, sulfur, chlorine, arsenic, selenium or boron, preferably boron. As used herein, the term "electrically conducting" means having an electrical resistivity of about $10^6$ Ωcm or less, preferably about $10^5$ Ωcm or less, preferably about $10^4$ Ωcm or less, preferably about $10^3$ Ωcm or less, preferably about $10^2$ Ωcm or less. Doping can be achieved by implantation, but is preferably achieved by incorporation of the dopant element during synthesis of the diamond, e.g. during synthesis of the diamond by chemical vapour deposition (CVD) as described in EP 0 822 269 or WO 03/052174. When the doping element is boron, the maximum concentration of the doping elements in the diamond plate is preferably about $3 \times 10^{21}$ atoms per $cm^3$ or less, preferably about $1 \times 10^{21}$ atoms per $cm^3$ or less, preferably about $3 \times 10^{20}$ atoms per $cm^3$ or less, preferably about $1 \times 10^{20}$ atoms per $cm^3$ or less, preferably about $3 \times 10^{19}$ atoms per $cm^3$ or less, preferably about $1 \times 10^{19}$ atoms per $cm^3$ or less. When the doping element is boron, the minimum concentration of the doping elements in the diamond plate is about $1 \times 10^{17}$ atoms per $cm^3$ or more, preferably about $3 \times 10^{17}$ atoms per $cm^3$ or more, preferably about $1 \times 10^{18}$ atoms per $cm^3$ or more, preferably about $3 \times 10^{18}$ atoms per $cm^3$ or more.

Preferably, the electrode of the present invention consists essentially of a diamond plate. The term "consists essentially of" as used herein requires that the functional behaviour of the electrode is provided by diamond and the dopant(s) within it, and in particular that there is no other identifiable material such as a substrate, providing useful function to the electrode. This term is not intended to preclude the possibility that other components or features may be added to the electrode, for example one or more electrical connections may be added using metallization, brazing or other bonding means.

The use of a diamond plate which consists essentially of diamond as the electrode of the present invention is advantageous because, as compared to diamond coated electrodes, electrodes which are formed from solid diamond plates have increased operational lifetimes. More specifically, diamond coated electrodes suffer from the problem of pin-holes which allow the liquid being treated to penetrate the coating and electrochemically attack the interface between the diamond coating and substrate resulting in delamination. A further advantage of using an electrode which consists essentially of a diamond plate is that a wider variety of complex shaped diamond plates may be used as compared to where the electrode is formed from a diamond coated plate. This is because where the electrode is a diamond coated electrode, the shape of the plates is limited by virtue of the fact that it is very difficult to coat substrates having a complex shape.

The diamond plate may be single crystal synthetic diamond, natural Type IIb diamond or polycrystalline diamond, and is preferably polycrystalline diamond. The diamond plate may be natural diamond, HPHT diamond or CVD diamond. Preferably, the diamond plate is CVD diamond.

Preferably, the diamond plate is CVD polycrystalline diamond. CVD polycrystalline diamond layers typically have a nucleation face, which conforms to the profile of the substrate on which it is grown. Therefore, the nucleation face is generally substantially flat and relatively smooth. CVD polycrystalline diamond layers also typically have a growth face, which has crystal facets and is generally substantially rough. The roughness, $R_a$, of the as-grown growth surface of a CVD polycrystalline diamond layer is typically about 10% of the as-grown thickness of the layer.

Where the diamond plate is CVD polycrystalline diamond, either the nucleation face or the growth face or both may be used in an unprocessed form or in a processed form. Using the growth face and/or nucleation face in an unprocessed form has an advantage of being easier and cheaper to fabricate, requiring less production steps. Using the growth face and/or nucleation face in a processed form has an advantage of providing better performance, for example, processing the growth face typically produces a flatter surface, while processing the nucleation face typically improves the quality of the diamond exposed at the surface.

As used herein, the term "elongate aperture" refers to an opening such as a gap, slot or slit which has a length which is greater than its maximum width. Preferably, the ratio of the maximum length to the maximum width (i.e. the aspect ratio) is about 2 or more, preferably about 3 or more, preferably about 5 or more, preferably about 7 or more, preferably about 10 or more, preferably about 12 or more, preferably about 15 or more, preferably about 20 or more, preferably about 30 or more, preferably about 50 or more, preferably about 70 or more, preferably about 100 or more, preferably about 200 or more, preferably about 500 or more. Preferably, the ratio of the maximum length to the maximum width is from about 10 to about 200, preferably from about 20 to about 100.

In the case of the present invention, an elongate aperture may be made in the diamond plate using a laser and positioning the diamond plate on a computer-numerically-controlled x-y table. Laser cutting is a preferred means of processing diamond and is particularly preferred in the present application. A typical laser cut aperture is wider at the entry face and narrower at the exit face, thereby resulting in tapered aperture walls. This effect is called the "kerf angle" and the kerf angle is typically about 3° to 12° full angle. As a consequence of the kerf angle, it is common for laser cut aperture walls not to be perfectly normal to the major face (or entry face) of diamond. However, it is possible to obtain laser cut aperture walls which are orthogonal to the major face (or entry face) of the diamond by using an asymmetric cut so that the whole of the kerf angle is in the wasted material. Typically the apertures are laser cut from the nucleation surface of the plate, so apertures are wider at the nucleation surface than at the growth surface.

While the use of a laser to make the apertures is preferred, other methods such as ion beam milling and plasma etching are not excluded. Other techniques that are as yet unknown may also be used to make the apertures.

At least one elongate aperture should be present in the diamond plate. For example, there may be 2, 3, 5, 10, 15, 25, 50, 80, 100, 130, 160, 200, 300, 500, 1000 or more than 1000 elongate apertures present in the diamond plate. Preferably the number of elongate apertures present in the diamond plate is from 20 to 150. It is clear to a person skilled in the art that the exact number of elongate apertures used is dictated by the elongate aperture width, the maximum spacing between elongate apertures and the dimensions of the working area of the diamond plate.

An elongate aperture may be straight-sided or curved. An advantage of having a straight-sided elongate aperture is that it is easier to cut and, as explained above, reduces the number of stress concentration steps that are present in the diamond plate.

As used herein, the term "straight-sided" as used in relation to an elongate aperture means sides that are straight and preferably parallel between the ends of the elongate aperture. A curved elongate aperture comprises at least one curve, i.e. the elongate aperture may curve, at least once, through an angle e.g. 30°, 45°, 60°, 90°, 120° or 150°. The curve or curves in the elongate aperture may have sharp corners, or may have corners with a smooth radius of curvature. An advantage of sharp-cornered curves is a reduction in the number of stress concentration steps in the diamond plate due to the absence of curved edge length. Preferably at least the longest sides of the elongate aperture are straight.

The ends of an elongate aperture may also be straight or curved and are preferably curved. A straight-sided elongate aperture has a longitudinal axis running from one end of the elongate aperture to the other end.

When discussing the edge length of an elongate aperture it is meant the edge between either the front or the back surface of the diamond plate and the elongate aperture walls. The "front surface" of the diamond plate is preferably the growth face of the diamond. The "back surface" of the diamond plate is preferably the nucleation face of the diamond. Thus, the edge length of an elongate aperture is the distance measured along the edge of the elongate aperture formed between the front surface of the diamond plate and the elongate aperture walls. Alternatively, the edge length of an elongate aperture is the distance measured along the edge of the elongate aperture formed between the back surface of the diamond plate and the elongate aperture walls. In many embodiments of the present invention, the edge length of an elongate aperture measured with respect to the front surface of the diamond plate will be the substantially same as the edge length of an elongate aperture measured with respect to the back surface of the diamond plate. However, if the elongate aperture walls are tapered through the thickness of the diamond plate, the edge length of an elongate aperture measured with respect to the front surface may differ from the edge length measured with respect to the back surface.

When there is more than one elongate aperture present, the edge length of the elongate apertures is the sum of the individual edge lengths of all the elongate apertures measured between either the front surface or the back surface of the diamond plate and the elongate aperture walls.

As used herein, the "aperture edge length per unit working area of the diamond plate" is an average which may be measured by calculating the total edge length of the elongate apertures formed between the working area of the front surface and the elongate aperture walls and dividing this value by the area of the front surface. Alternatively, the edge length per unit working area may be measured by calculating the total edge length of the elongate apertures formed between the back surface and the elongate aperture walls and dividing this value by the area of the back surface.

Thus, for example, an elongate aperture that is rectangular in shape with dimensions X and Y will have an edge length of $2X+2Y$. An electrode with a total of N such rectangular elongate apertures within a rectangular working area with dimensions A and B will have an edge length per unit working area of $(N\times(2X+2Y))\div(A\times B)$.

As described above, the elongate aperture walls may be tapered through the thickness of the diamond plate. When the elongate aperture walls are tapered, the edge length of an elongate aperture measured between the front surface of the diamond plate and the elongate aperture walls will be different to the edge length measured between the back surface of the diamond plate and the elongate aperture walls. Typically the difference will be very small, e.g. less than 1%.

When being used for electrochemical reactions according to the present invention, a proton exchange membrane (PEM) may be present immediately adjacent to either the front surface or the back surface of the diamond plate. An advantage of placing the PEM immediately adjacent to an unprocessed growth face of a diamond plate, is that better performance may be obtained from the electrode. An advantage of placing the PEM immediately adjacent to an unprocessed nucleation face of a diamond plate, is that the nucleation face is flatter and hence there is a better contact between the PEM and the diamond plate. In some applications, the PEM is preferably present immediately adjacent to the nucleation face of the diamond plate. In other applications, such as where the growth face is processed, the PEM may preferably be present immediately adjacent the growth face. The PEM may be constructed from any suitable material known in the art including Nafion® film (N117, Dupont) PEM.

A PEM is a semi-permeable membrane which only allows the passage of protons, that is, hydrogen ions ($H^+$), whilst being impermeable to gases, such as hydrogen, oxygen and ozone, liquids, such as water, and other ionic species, such as $Na^+$, $OH^-$ and $O^{2-}$.

Alternatively the PEM may be replaced with another solid electrolyte that allows the passage of a different ion species thereby enabling the device to be used in a different process.

When a diamond plate of the present invention with tapered elongate aperture walls is used in combination with a PEM, as discussed above, the surface of the diamond plate immediately adjacent to the PEM may be the surface with the greatest edge length per unit working area. This arrangement would lead to a higher rate of electrochemical reaction, preferably ozone production, per unit working area of the diamond plate. However, a potential disadvantage of this arrangement is product inhibition of the reaction site. As used herein, the "reaction site" is the three phase interface, or the triple point, between the PEM, the diamond plate and a fluid, preferably water, into which the diamond plate/PEM device is placed. Tapering elongate aperture walls may lead to the trapping of products at the reaction site and hence inhibition of the electrochemical reaction. It is preferable that the length of the reaction site of a diamond plate/PEM device is the aperture edge length of the diamond plate i.e. the aperture edge length is preferably measured with respect to the surface of the diamond plate that is immediately adjacent to the PEM.

When a diamond plate of the present invention with tapered elongate aperture walls is used in combination with a PEM, as discussed above, the surface of the diamond plate immediately adjacent to the PEM may be the surface with the smallest edge length per unit working area. This arrangement would lead to a lower rate of electrochemical reaction, preferably ozone production, per unit working area of the diamond plate. However, an advantage of this arrangement is the reduction of product inhibition. It is significantly easier for the products to escape the reaction site compared to a situation wherein the surface of the diamond plate immediately adjacent to the PEM is the surface with the largest edge length per unit working area or wherein the elongate aperture walls are not tapered.

Where a PEM is present immediately adjacent to the back surface of the diamond plate, the edge length per unit working area of the diamond plate is measured along the edge present between the back surface of the diamond plate and the elongate aperture walls.

As used herein, the area of the diamond plate refers to the working area of either the front surface or the back surface of the diamond plate prior to the cutting of the elongate aperture(s). As used herein, the "working area" of the diamond plate is the area of the diamond plate into which the at least one elongate aperture is cut. The elongate aperture(s) may be cut into a small proportion of the entire area of the surface of the diamond plate; in this case this section is known as the working area. Provided that the sides of the diamond plate are not tapered, the area of the diamond plate will be independent of whether it is measured using the front or back surface.

The elongate apertures are arranged in such a way that at least one of the edge length per unit working area of the diamond plate measured either with respect to the front surface or with respect to the back surface of the diamond plate, is greater than about 4 $mm/mm^2$, preferably about 4.5 $mm/mm^2$ or more, preferably about 5 $mm/mm^2$ or more, preferably about 5.5 $mm/mm^2$ or more, preferably about 6 $mm/mm^2$ or more, preferably about 6.5 $mm/mm^2$ or more, preferably about 7 $mm/mm^2$ or more, preferably about 8 $mm/mm^2$ or more, preferably about 9 $mm/mm^2$ or more, preferably about 10 $mm/mm^2$ or more. The elongate apertures may be arranged in such a way that the edge length per unit working area of the diamond plate is from about 4 $mm/mm^2$ to about 10 $mm/mm^2$, preferably from about 4.5 $mm/mm^2$ to about 9 $mm/mm^2$, preferably from about 5 $mm/mm^2$ to about 8 $mm/mm^2$, preferably from about 6 $mm/mm^2$ to about 7 $mm/mm^2$. Preferably the edge length per unit working area is about 4 $mm/mm^2$. Preferably the edge length per unit working area is about 6.5 $mm/mm^2$.

An elongate aperture preferably has a maximum width of less than about 0.5 mm. Preferably the maximum width is about 0.45 mm or less, about 0.4 mm or less, about 0.35 mm or less, about 0.3 mm or less, about 0.25 mm or less, about 0.2 mm or less, about 0.15 mm or less, about 0.1 mm or less. Preferably the maximum width is about 0.1 mm or greater and is less than about 0.5 mm, preferably from about 0.2 mm to about 0.4 mm, preferably from about 0.2 mm to about 0.3 mm, preferably the maximum width is about 0.2 mm.

The width of an elongate aperture may not be the same along the entire length of the elongate aperture, e.g. when the edges of the elongate aperture along which the edge length is measured are not parallel. In this case the maximum width is measured at the point at which the distance between the sides of the elongate aperture is greatest. Preferably, the edges of an elongate aperture are parallel and the width of the elongate aperture is the same along the entire length of the elongate aperture.

When a diamond plate comprises two or more elongate apertures, the maximum widths may be identical. Alternatively, at least one elongate aperture may have a maximum width that is different from that of an adjacent elongate aperture. Alternatively, all the elongate apertures may be of different maximum widths. Preferably, the maximum widths of the elongate apertures are identical.

The elongate aperture may adopt a variety of arrangements, e.g. a spiral arrangement. A spiral may be a log spiral or may have an equal distance between successive loops. A plurality of spiral arrangements may be present on a single diamond plate. When a diamond plate comprises two or more apertures, the apertures may be arranged such that they are parallel. Alternatively, the elongate apertures may be arranged in a variety of other ways such as a random arrangement, one or more circular arrangements, or one or more spoke formations.

It is preferable that each elongate aperture is parallel to an adjacent elongate aperture. A number of arrangements of elongate apertures can be envisaged, including parallel pairs of elongate apertures, and clusters of parallel elongate apertures. Each cluster may include the same or a different number of elongate apertures. It is preferable that there is more than one elongate aperture. Furthermore, preferably each of the elongate apertures has a longitudinal axis and the longitudinal axes of all elongate apertures are parallel.

When a diamond plate comprises two or more elongate apertures, the maximum spacing between adjacent elongate apertures is about 0.6 mm or less, preferably about 0.5 mm or less, preferably about 0.3 mm or less, preferably about 0.2 mm or less, preferably about 0.1 mm or less. Preferably the maximum spacing between adjacent elongate apertures is from about 0.1 mm to about 0.6 mm, preferably from about 0.2 mm to about 0.5 mm, preferably from about 0.4 mm to about 0.3 mm, preferably the maximum spacing is about 0.3 mm. The spacing between adjacent elongate apertures may differ along their lengths. Preferably, the edges of adjacent elongate apertures are parallel and the spacing between adjacent elongate apertures is the same along the entire length.

When a diamond plate comprises two or more elongate apertures, the elongate aperture lengths may be identical.

Alternatively, at least one elongate aperture may have an elongate aperture length that is different from that of an adjacent elongate aperture. Alternatively, all the elongate apertures may be of different lengths. Preferably, the elongate aperture lengths are identical. An advantage of elongate apertures of identical length is in their ease of manufacture. For example, it would be time-consuming to programme the cutting machine to cut a number of apertures of differing lengths.

The elongate apertures may be arranged with at least one elongate aperture parallel to a side of the diamond plate. When more than one elongate aperture is arranged so as to be parallel to a side of the diamond plate, the apertures may be arranged in clusters of two or more apertures, each aperture being parallel to an adjacent aperture and also parallel to a side of the diamond plate.

Where the diamond plate comprises at least two elongate apertures in each of two orthogonal directions, preferably the longitudinal axis of each elongate aperture is aligned with the longitudinal axis of each adjacent aperture(s) and each elongate aperture is positioned relative to an adjacent aperture such that the ends of the elongate apertures are co-terminal. Such an arrangement is advantageous as the presence of "bars" between adjacent elongate apertures means that the electrode has an improved structural integrity.

When a diamond plate comprises two or more elongate apertures, at least one elongate aperture can be arranged in a staggered position relative to an adjacent elongate aperture such that the ends of the elongate apertures are not adjacent.

As an alternative to using a diamond plate, the electrode of the present invention may be formed by coating an electrically conductive substrate in which at least one elongate aperture has already been prepared with a conductive diamond layer. Advantageously, this enables the backing plate and flow channels to be incorporated into a single component and the use of a conductive diamond coating as compared to a monolithic diamond plate has cost advantages.

The electrically conducting material is not limited and may be, for example, silicon, silicon carbide, molybdenum or tungsten. An elongate aperture may be made in the electrically conducting material by any appropriate technique such as machining, etching, electro-discharge machining, laser machining, spark erosion or any other suitable technique known in the art.

A layer of conductive CVD diamond, preferably boron doped CVD diamond is then deposited on the electrically conducting material by techniques known in the art. The thickness of the deposited layer is chosen such that there is complete coverage over the whole of the surface of the electrically conducting material, including in the elongate aperture(s) and may depend on the dimensions of the elongate aperture(s). The thickness of the conductive CVD diamond layer is typically in the range from 5 µm to 100 µm, preferably 10 µm to 50 µm. During use, it is necessary to ensure that the electrically conducting substrate does not come into contact with any conductive fluid to ensure that it is not electrochemically attacked.

A PEM can then be attached to the surface of the coated substrate formed in the manner described in detail above.

In one embodiment, the electrode of the present invention consists essentially of an electrically conducting diamond plate which comprises at least one elongate aperture and has an aperture edge length per unit working area of the diamond plate of greater than about 4 mm/mm$^2$, preferably about 4.5 mm/mm$^2$ or more, preferably about 5 mm/mm$^2$ or more, preferably about 5.5 mm/mm$^2$ or more, preferably about 6 mm/mm$^2$ or more, preferably about 6.5 mm/mm$^2$ or more, preferably about 7 mm/mm$^2$ or more, preferably about 8 mm/mm$^2$ or more, preferably about 9 mm/mm$^2$ or more, preferably about 10 mm/mm$^2$ or more. In this embodiment, preferably the diamond plate is partially covered with a cover plate such that the ends of the at least one elongate aperture are uncovered and wherein one end of the at least one elongate aperture forms an inlet for fluid and the other end forms an outlet for fluid. In this embodiment, preferably the growth face and more preferably both the growth face and nucleation face of the diamond plate are in a processed form.

In a second aspect, the present invention provides an electrochemical cell. The electrode of the present invention may be placed adjacent to a PEM. This polymer membrane is necessary when the diamond plate of the present invention is to be used in the electrolysis of water to produce ozone.

Additionally, a further electrode may be placed on the other side of the PEM to form a device comprising an electrode of the present invention, a PEM, and a further electrode. This further electrode may be made of any suitable material, and is preferably a platinum mesh electrode.

In a third aspect, there is provided a method of treatment of water using an electrochemical cell of the present invention.

In a fourth aspect, there is provided a method of production of ozone by the electrolysis of water using an electrochemical cell of the present invention.

Advantageously, where an electrochemical cell of the present invention is used in the electrolysis of water to produce ozone, the rate of ozone production is at least about 0.03, about 0.05, about 0.10, about 0.15, about 0.20, about 0.25, about 0.30 mg/min/mm$^2$ of working area of the electrode.

When a device comprising the electrode of the present invention, a PEM and a further electrode is immersed in fluid, preferably water, a three-phase interface is formed between the PEM, the electrode of the present invention and the fluid. This is the reaction site, i.e. the site of the electrochemical reaction. When the electrode of the present invention is biased as the anode and the further electrode is biased as the cathode, electrolysis of the fluid at the reaction site occurs. Any ions produced during electrolysis are removed from the reaction site through the solid electrolyte to react at the further electrode, which is biased as the cathode. When the fluid used is water, ozone is produced at the reaction site and hydrogen ions are removed from the reaction site through the PEM to react with electrons at the cathode and produce hydrogen gas.

After reaction at the cathode, the flow of fluid from the cathode region of the device may be fed back through to the anode region of the device for output as drinking water suitable for human consumption. Advantageously, where this is the case, the device of the present invention can be used in conjunction with a single standard supply.

At least two of the devices of this aspect may be arranged in an array wherein each device is positioned adjacent and parallel to at least one further device. The devices are positioned in opposing orientation, i.e. the diamond plate of the present invention of one device facing the diamond plate of the present invention of the neighbouring device. When arranged in an electrochemical cell, the diamond plate of the present invention of each device is biased as the anode and the further electrode of each device is biased as the cathode. The water to be ozonised flows adjacent, and between, two adjacent anodes. Similar adjacent elements from neighbouring electrochemical cells may be replaced by a single element used by both electrochemical cells. For example, both sides of a single diamond electrode may be used in adjacent electrochemical cells. Likewise, both sides of a platinum mesh electrode may be used in adjacent electrochemical cells. An advantage of this arrangement is a reduction in the cost of materials.

A problem of the prior art electrodes is the removal of reaction products, particularly gas bubbles, from the reaction site to allow for fresh reactants to undergo an electrochemical reaction at the reaction site. As smaller circular apertures are used, there is an increased probability of reaction products becoming lodged in the circular apertures and inhibiting the electrochemical reaction. Elongate apertures are far less likely to suffer from this inhibition, since the reaction products would escape more easily. Therefore, elongate apertures having maximum widths smaller than the diameter of a circular aperture of the prior art may be used without encountering these problems. Consequently, a higher edge length per unit working area of the diamond plate is possible with elongate apertures before product inhibition is encountered. In addition, tapering the elongate aperture walls through the thickness of the diamond plate may allow greater ease of removal of products from the reaction site. It is preferable that the elongate apertures are arranged in an approximately vertical orientation, i.e. parallel or close to parallel to the direction of the force of gravity. An advantage of this orientation is that any gaseous reaction products are able to escape more easily than if the elongate apertures were arranged perpendicular to the direction of the force of gravity. It is preferable that the electrode(s) are used in an orientation such that the buoyancy of any bubbles of any gaseous reaction product produced assists in the escape of the bubbles from the reaction site.

In a fifth aspect, the present invention provides a forced flow configuration. A diamond plate as described herein can be partially covered with a cover plate such that the central portion of the elongate aperture is covered and the ends of the elongate aperture are uncovered. The surface of the diamond plate immediately adjacent to the cover plate forms the front surface (6). When more than one elongate aperture is present, the cover plate is arranged so that the central portions of the elongate apertures are covered and the ends of the elongate apertures are uncovered. The cover plate is preferably a flat plate and can be made from any suitable material, preferably an electrical insulator e.g. a plastic or polymeric material such as polyvinylchloride (PVC), polypropylene (PP), polyethylene (PE), polytetrafluoroethane (PTFE). One end of an elongate aperture forms an inlet and the other end forms an outlet. Consequently, when more than one elongate aperture is present, there will be a plurality of inlets and outlets.

Advantageously, partially covering the diamond plate with a cover plate ensures that the fluid to be treated e.g. water is a minimum distance away from the working area of the electrode. In addition, the inclusion of a cover plate means that bubble formation in the elongate apertures is minimised thus maximising the efficiency of the system.

In a further aspect of the forced flow configuration of the present invention, a diamond plate is provided into which a main channel is cut. The main channel has a length which is longer than its width, two sides which run along the length of the main channel and two ends that run along the width. The main channel may be cut using any of the techniques described herein for cutting the elongate apertures. The main channel may be straight-sided or curved and is preferably straight sided. The main channel is cut across at least one of the sides of the diamond plate such that if a cover plate were applied that substantially covered the entire front or back surface of the diamond plate, an inlet/outlet to the main channel is present on the side of the diamond plate. Preferably the main channel is cut across one of the sides of the diamond plate. The main channel may be present anywhere on the diamond plate and is preferably parallel to a side of the diamond plate.

In addition, at least one elongate aperture is present wherein one end of the aperture is in fluid contact with the main channel. The end of the aperture that is not in contact with the main channel is located at the side of the diamond plate such that if a cover plate were applied that substantially covered the entire front or back surface of the diamond plate, an inlet/outlet to the aperture is present on the side of the diamond plate. The aperture may be any aperture described herein and is preferably a straight-sided aperture. Preferably the aperture makes a 90° angle with the main channel. Preferably more than one aperture is present, in this case one end of each aperture is in fluid contact with the main channel and one end is located at the side of the diamond plate. Preferably the apertures are parallel to each other and each aperture makes a 90° angle with the main channel. All of the apertures are preferably the same length. Preferably, the maximum spacing between adjacent apertures is the same. Preferably the maximum width of each aperture is the same. The apertures may be connected to one or both of the sides of the main channel. The apertures are preferably connected to one side of the main channel; in this case the side of the main channel may be located substantially closer to one of the sides of the diamond plate. In this embodiment, substantially closer means a maximum separation between the side of the main channel and the side of the diamond plate of about 10 mm or less, preferably about 5 mm or less, preferably about 2 mm or less, preferably about 1 mm or less.

Preferably the entire front or back surface of the diamond plate is covered with a cover plate such that the inlet/outlet of the main channel and the inlet(s)/outlet(s) of the elongate aperture(s) are located at the sides of the diamond plate. Preferably a PEM may be present immediately adjacent to the surface of the diamond plate which is not covered with the cover plate. In this case the main channel and apertures are enclosed except for the end(s) which are located at the sides of the diamond plate. When this aspect is used with a forced flow configuration, the fluid, e.g. water, may be pumped in through the aperture inlet(s) and allowed to exit through the main channel outlet. Preferably, the fluid, e.g. water, is pumped in through the main channel inlet and allowed to exit through the elongate aperture outlet(s). Preferably the apertures are arranged parallel to the direction of the force of gravity and that the main channel is positioned at the bottom of the plate with apertures positions vertically upwards from the uppermost side of the main channel. In this case, the fluid is pumped through the main channel and vertically upwards through the apertures to the aperture outlets.

In this aspect of the present invention, the edge length per unit working area of the diamond plate includes the edge length of the main channel. The edge length of the main channel is calculated as the edge length excluding the sections of edge length which have been removed by the aperture connections.

At least one manifold may also be present to allow fluid flow to the inlet end(s) of the elongate aperture(s) and away from the outlet end(s) of the elongate aperture(s). Preferably, a single inlet manifold and a single outlet manifold are present. The inlet manifold comprises one or more fluid inlet apertures and the outlet manifold comprises one or more fluid outlet apertures. The inlet manifold covers the inlet end(s) of the elongate aperture(s) while the outlet manifold covers the outlet end(s) of the elongate aperture(s). The manifold(s) may be designed in any suitable way known in the art. In addition, the skilled person will appreciate that the cover plate and the manifold(s) could be made as a single component.

The surface of the diamond plate immediately adjacent to the cover plate may be processed subsequent to the growth of the plate, i.e. by lapping and optionally polishing to have a surface roughness, $R_a$, of less than about 1 µm. Alternatively, the surface of the diamond plate immediately adjacent to the cover plate may be present in the as-grown condition, i.e. the surface has not been treated subsequent to growth of the diamond plate. In general, the surface roughness, $R_a$, of an as-grown surface is about 10% of the as-grown thickness of the plate, typically 10 µm or more. In both the as-grown and processed aspects, it is preferable to provide a seal between the surface of the diamond plate and the cover plate, and between the surface of the diamond plate and the manifold(s) to prevent leakage of the fluid. This seal may be present around the periphery of the diamond plate. Clearly, a single component cover plate and manifold(s) will reduce the number of seals that are required.

When a PEM is present, the manifolds allow fluid to be channelled through an elongate aperture in the region between the cover plate, the PEM and the elongate aperture walls. This fluid may be under pressure in a forced flow configuration and will flow between the inlet end and the outlet end of the elongate aperture.

Agitation of the fluid in the elongate apertures may also be utilised with the present invention. Agitation may be achieved by any suitable means known in the art e.g. ultrasound, pulsed fluid flow or turbulent fluid flow. Agitation may aid the mixing of the ozone into the water and assist in removing bubbles and preventing bubble formation.

An advantage of this forced flow configuration is that the minimum width of the elongate apertures can be made smaller than is possible with a non-forced flow configuration, i.e. when the diamond plate is present without the cover plate and the manifold(s) because the possibility of product inhibition in the elongate aperture is avoided. In particular, bubble formation is avoided because the bubble nuclei will be swept out by the flow before a bubble has a chance to form. A decrease in the minimum width of the elongate apertures will increase the edge length per unit working area of the diamond plate and hence increase the rate of reaction at the reaction site. When using a diamond plate with tapered elongate aperture walls, the reduction in bubble formation allows the surface of the diamond plate immediately adjacent to the PEM to be the surface with the greatest edge length per unit working area without significant inhibition of the electrochemical reaction, as discussed above. If the elongate apertures are arranged substantially parallel to the direction of the force of gravity, in order to allow gaseous reaction products to escape more easily, it is preferable that the inlet manifold is positioned at the bottom of the plate and the fluid is pumped vertically upwards to the outlet manifold which is positioned at the top of the plate. This configuration is able to further increase the ease of escape of the gaseous reaction products.

An additional advantage of the forced flow configuration is that the fluid flowing through the device will undergo a more uniform electrochemical reaction as all the fluid passing through the device will come into close contact with the reaction site. In the case of the electrolysis of water to form ozone, the water will be more uniformly ozonised.

The fluid forming part of the three phase interface undergoes forced flow though the device. Advantageously, the fluid flow through the device is greater than about 0.1 $cm^3$ per second per $cm^2$ of passage cross section per cm of passage length, preferably greater than about 1 $cm^3$ per second per $cm^2$ of passage cross section per cm of passage length, preferably greater than about 10 $cm^3$ per second per $cm^2$ of passage cross section per cm of passage length, preferably greater than about 100 $cm^3$ per second per $cm^2$ of passage cross section per cm of passage length. The term "passage" is used in this context to describe the path taken by the fluid through the device, the dimension and shape of which will depend on the particular arrangement of the apparatus as is described above.

In order to achieve forced flow of the fluid, advantageously, the fluid enters the device under pressure. Preferably the applied pressure above atmospheric pressure at the point of entry of the fluid into the apparatus is greater than about 0.1 bar, preferably greater than about 0.2 bar, preferably greater than about 0.5 bar, preferably greater than about 0.8 bar, preferably greater than about 1 bar, preferably greater than about 5 bar, preferably greater than about 10 bar. Therefore, advantageously, the device of the present invention is suitable for use in a standard domestic water supply system.

Advantageously, the pressure drop between the point of entry of the fluid into the device, which may, for example be an inlet manifold, and the point of exit of the fluid from the device, which may, for example be an outlet manifold, is less than about 10 bar, preferably less than about 8 bar, preferably less than about 5 bar, preferably less than about 3 bar, preferably less than about 1 bar, preferably less than about 0.8 bar, preferably less than about 0.5 bar, preferably less than about 0.2 bar.

Whilst it is advantageous that fluid only passes along the elongate apertures from the inlet manifold to the outlet manifold, it is not essential that it does so provided that the pathway from the inlet manifold to the outlet manifold is the dominant pathway for the fluid flow. If there are a small number of gaps between the cover plate and/or manifold and the diamond plate, the device will still perform satisfactorily.

Advantageously, the cover plate and/or manifold structure can form the main structural component of the device, supporting the diamond plate. In this way the diamond plate can be made thinner, thereby reducing manufacturing cost.

A further advantage of this forced flow configuration, in the case of the electrolysis of water to produce ozone, is that it ensures that the water being ozonised passes as close to the reaction site as possible. This is important since ozone has only a short lifetime in water.

Where at least two devices comprising the electrode of the present invention, a PEM and a further electrode, as described above, are arranged in an array wherein each device is positioned adjacent and parallel to at least one further device, the forced flow configuration is particularly advantageous in that it assists with movement of the electrolyte through the array of devices.

A further advantage of the device comprising the electrode of the present invention is that it is not limited to being used with mains electricity as a power source and may alternatively be used in combination with a power source which utilises renewable energy sources such as, for example, solar power or wind. The device comprising the electrode of the present invention thus lends itself to the treatment of water in developing countries where access to mains electricity is problematic. Alternatively other portable electrical power sources such as batteries or generators might also be used in combination with the apparatus of the present invention.

DESCRIPTION OF THE DRAWINGS

Specific embodiments of the present invention will now be described by way of example with reference to the following figures in which:

FIG. 1(a) shows an elongate aperture cut into a diamond plate;

FIG. 1(b) shows a cross-section through the elongate aperture of FIG. 1(a);

FIGS. 2(a)-(b) show examples of straight-sided elongate apertures;

FIG. 3(a)-(c) shows an example of a bent-sided aperture;

FIG. 4 shows the working area of a diamond plate;

FIG. 8 shows a diamond plate/PEM/further electrode device;

FIG. 9 shows a diamond plate with a cover plate;

FIG. 10 shows a diamond plate with a cover plate and a manifold plate;

FIG. 12 shows an array of two diamond plate/PEM/further electrode devices positioned in opposing orientations and sharing a diamond plate electrode;

FIG. 13 shows an array of two diamond plate/PEM/further electrode devices in opposing orientations;

DETAILED DESCRIPTION OF THE INVENTION

Figure 5A:
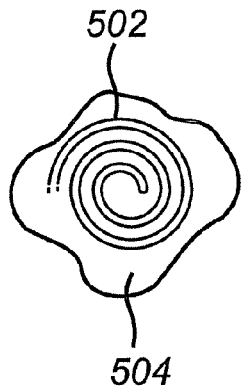
FIGS. 5(a) and (b) show examples of arrangements of non-parallel elongate apertures.

FIG. 1(a) shows an example of an elongate aperture (2) cut into a diamond plate (4). The diamond plate (4) may be of any shape having a front surface (6) and a back surface (8), sides (13) and a depth or thickness (14). In the embodiment shown in FIG. 1, the diamond plate is rectangular having a length (10) and a width (12). The elongate aperture (2) is cut through the entire thickness (14) of the diamond plate (4) and consequently extends from the front surface (6) of the diamond plate (4) to the back surface (8). The exposed diamond surfaces inside an elongate aperture (2), which have been exposed by the presence of the elongate aperture (2), are hereinafter called the "elongate aperture walls" (16). The elongate aperture (2) can be cut into the diamond plate (4) by any suitable technique known in the art including laser techniques, plasma etching, spark erosion, electro-discharge machining and ion beam milling. The edge length of the elongate aperture (2) is its perimeter which is the sum of the two longer edges (20) and the two shorter edges (18). The aspect ratio of the elongate aperture (2) is the length of the edge of the aperture (20) divided by the length of the edge of the aperture (18).

FIG. 1(b) shows a cross-section through the elongate aperture of FIG. 1(a). The elongate aperture (2) is formed in the diamond plate (4). There is an edge (3) at the intersection between the front surface (6) of the electrode and the elongate aperture walls (16) and a similar edge (5) at the intersection between the back surface (8) of the electrode and the elongate aperture walls (16).

FIGS. 2(a) and 2(b) show examples of straight-sided elongate apertures (2). In the embodiment shown in FIG. 2(a) the elongate aperture has parallel sides and has a maximum length (40). Since the sides of the elongate aperture (2) of this embodiment are parallel, the width (32) of the elongate aperture is the same along its entire length. The ends (24) of the elongate aperture of this embodiment are curved. In the embodiment shown in FIG. 2(b), the elongate aperture (102) is drop shaped. In this embodiment, the sides of the elongate aperture (102) are not parallel and the maximum length of the elongate aperture is shown by arrow (140). Since the sides of the elongate aperture (102) are not parallel, the maximum width of the elongate aperture (102) of this embodiment is shown by arrow (132). The ends (124) of the elongate aperture of this embodiment are curved. Elongate apertures (2, 102) of the embodiments shown in FIGS. 2(a) and 2(b) have a longitudinal axis (26).

FIGS. 3(a)-(c) show examples of curved elongate apertures. FIG. 3(a) shows an embodiment with 3 curves (220) along the length of the elongate aperture with the length of the elongate aperture (202) shown by arrow 240 and the width shown by arrow 232. The width (232) of the elongate aperture (202) of this embodiment is the same along the entire length (240) of the elongate aperture (202). The curves (220) of this embodiment have a smooth radius of curvature. The curves (220) of this embodiment curve through an angle of 120°. The ends (224) of the elongate aperture (202) of this embodiment are curved.

FIG. 3(b) shows an embodiment with a single curve (218). The width (232) of the elongate aperture (202) of this embodiment is the same along the entire length (240) of the elongate aperture (202). The curve (218) of this embodiment has a sharp corner. The curve (218) of this embodiment curves through an angle of 90°. The ends (224) of the elongate aperture (202) of this embodiment are curved.

FIG. 3(c) shows an embodiment with a single curve (220). The width (232) of the elongate aperture (202) of this embodiment is the same along the entire length (240) of the elongate aperture (202). The curve (220) of this embodiment has a smooth radius of curvature. The curve (220) of this embodiment curves through an angle of 45°. The ends (222) of the elongate aperture (202) of this embodiment are straight.

While the length of the elongate aperture is illustrated by arrow 240 in FIGS. 3(a), 3(b) and 3(c), as the skilled person will appreciate, the total edge length of the elongate aperture is the total perimeter of the curved elongate aperture.

FIG. 4 shows an embodiment wherein a central working area (330) is cut into a diamond plate (304). Parallel elongate apertures (302) are cut into the working area of the diamond plate (304). When measuring the aperture edge length per unit working area of the diamond plate in this embodiment, the working area (330) of either the front surface (306) or the back surface (308) of the diamond plate (304) is calculated prior to cutting the elongate apertures (302). Then, the total elongate aperture edge length is calculated for the elongate apertures (302) cut into the working area with reference to either the front surface (306) or the back surface (308) of the diamond plate (304). The aperture edge length per unit working area of the diamond plate can then be found by dividing the total elongate aperture edge length present with respect to the front surface (306) by the working area measured on the front surface (306). Alternatively, the edge length per unit working area may be found by dividing the total edge length of the elongate apertures (302) present with reference to the back surface (308) by the working area measured on the back surface (308).

FIG. 5(a) shows an embodiment wherein a single the elongate aperture (502) is arranged in a spiral arrangement on the diamond plate (504). This embodiment shows a spiral with an equal distance between successive loops.

Figure 5B:
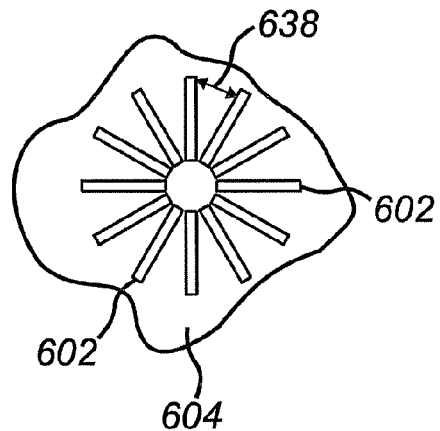

FIG. 5(b) shows an embodiment wherein the diamond plate (604) comprises two or more apertures (602), and the apertures are arranged in a spoke formation. The spoke formation of this embodiment comprises 12 spokes arranged with a maximum distance (638) between adjacent spokes.

Figure 6A:
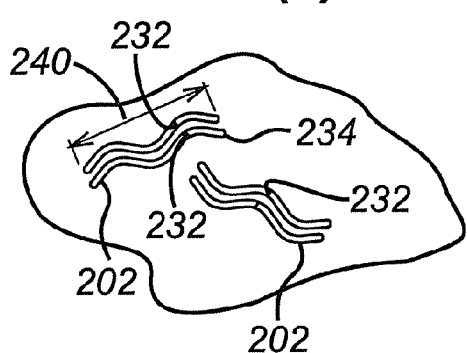
FIGS. 6(a)-(i) show examples of arrangements of parallel elongate apertures.
Figure 6B:
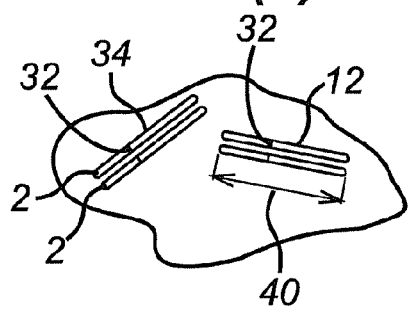
Figure 6C:
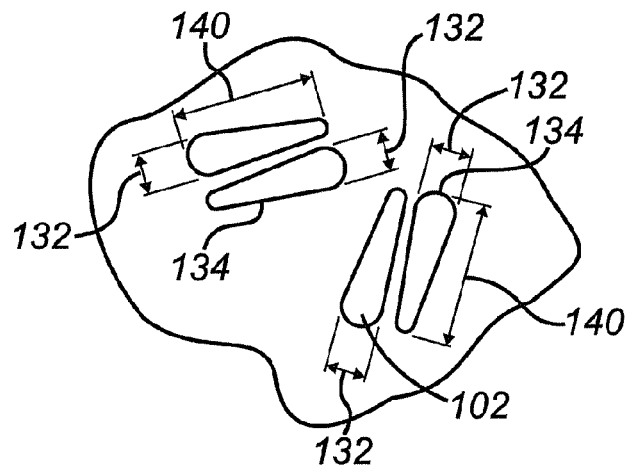
Figure 6D:
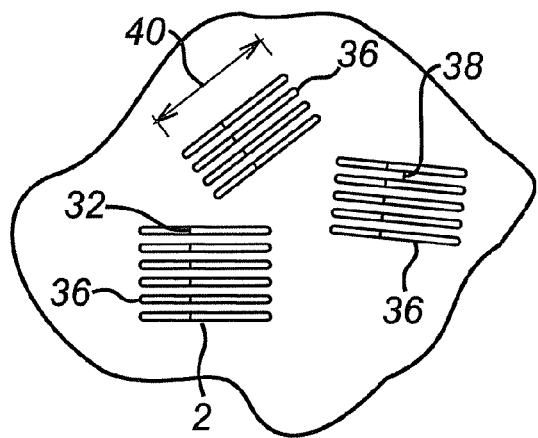

FIGS. 6(a)-(c) show arrangements of elongate apertures (202) in parallel pairs (234). In the embodiment shown in FIG. 6(a) the elongate apertures (202) are curved. The width (232) of the elongate apertures (202) of this embodiment is the same along the entire length (240) of each elongate aperture (202). In addition, the widths (232) of all the elongate apertures (202) are the same.

In the embodiment shown in FIG. 6(b) the elongate apertures (2) are straight-sided and have parallel sides. The width (32) of the elongate apertures (2) of this embodiment is the same along the entire length (40) of each elongate aperture (2). In addition, the widths (32) of all the elongate apertures (2) are the same.

In the embodiment shown in FIG. 6(c) the elongate apertures (102) are straight-sided and have non-parallel sides. Arrows labelled 132 show the maximum width of the elongate apertures of this embodiment. The widths (132) of the elongate apertures of this embodiment are different along the length (140) of the elongate apertures (102). In addition, the maximum widths (132) of all the elongate apertures (102) are the same.

FIGS. 6(d)-(g) show arrangements of elongate apertures (2) in clusters (36) of parallel elongate apertures (2). In the embodiment shown in FIG. 6(d) the clusters (36) contain different numbers of elongate apertures (2).

The elongate apertures of this embodiment are straight-sided and have parallel sides. Arrows labelled 32 show the width of the elongate apertures of this embodiment. The width (32) of the elongate apertures (2) of this embodiment is the same along the entire length (40) of each elongate aperture (2). In addition, the widths (32) of all the elongate apertures (2) are the same. The elongate apertures (2) of this embodiment are arranged with the same distance (38) between an aperture and an adjacent aperture.

Figure 6E:
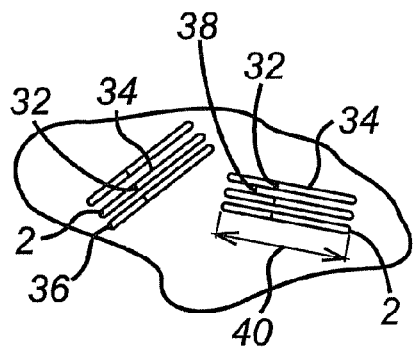

In the embodiment shown in FIG. 6(e) the clusters (36) contain three elongate apertures (2). The elongate apertures of this embodiment are straight-sided and have parallel sides. Arrows labelled 32 show the width of the elongate apertures of this embodiment. The width (32) of the elongate apertures (2) of this embodiment is the same along the entire length (40) of each elongate aperture (2). In addition, the widths (32) of all the elongate apertures (2) are the same. The elongate apertures (2) of this embodiment are arranged with the same distance (38) between an aperture and an adjacent aperture.

Figure 6F:
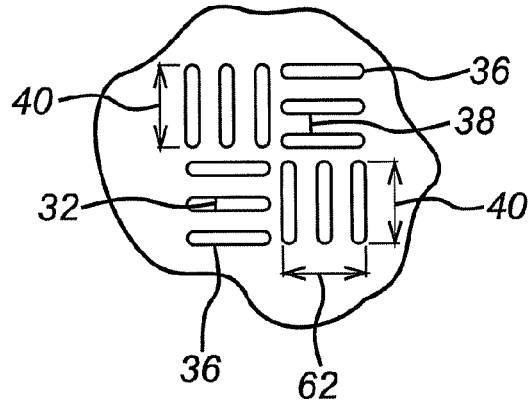

In the embodiment shown in FIG. 6(f) the clusters (36) contain three elongate apertures (2). Each cluster (36) of this embodiment makes up a quarter of a square. The length (40) and width (62) of each cluster is the same. The elongate apertures of this embodiment are straight-sided and have parallel sides. Arrows labelled 32 show the width of the elongate apertures of this embodiment. The width (32) of the elongate apertures (2) of this embodiment is the same along the entire length (40) of each elongate aperture (2). In addition, the widths (32) of all the elongate apertures (2) are the same. The elongate apertures (2) of this embodiment are arranged with the same distance (38) between an aperture and an adjacent aperture.

Figure 6G:
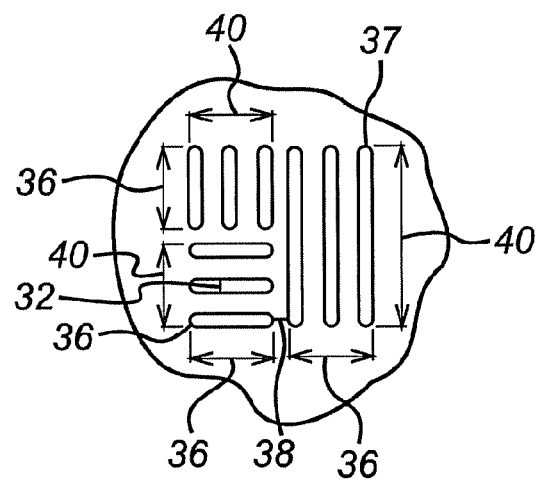

In the embodiment shown in FIG. 6(g) the clusters (36, 37) contain 3 elongate apertures (2). The lengths (40) of elongate apertures (2) in the same cluster are the same. However, the lengths of elongate apertures (2) in a third set of clusters (36) are different to the lengths of elongate apertures (2) in a second set of clusters (37). The length (40) of the elongate apertures in the first and second clusters (36) is different from the length (40) of the elongate apertures in the third cluster (37). The elongate apertures of this embodiment are straight-sided and have parallel sides. Arrows labelled 32 show the width of the elongate apertures of this embodiment. The width (32) of the elongate apertures (2) of this embodiment is the same along the entire length (40) of each elongate aperture (2). In addition, the widths (32) of all the elongate apertures (2) are the same. The elongate apertures (2) of this embodiment are arranged with the same distance (38) between an aperture and an adjacent aperture.

Figure 6H:
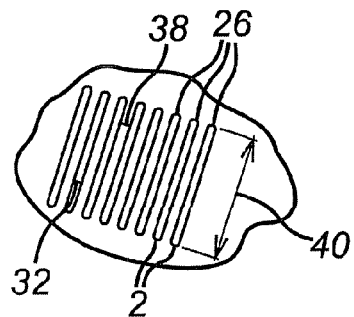
Figure 6I:
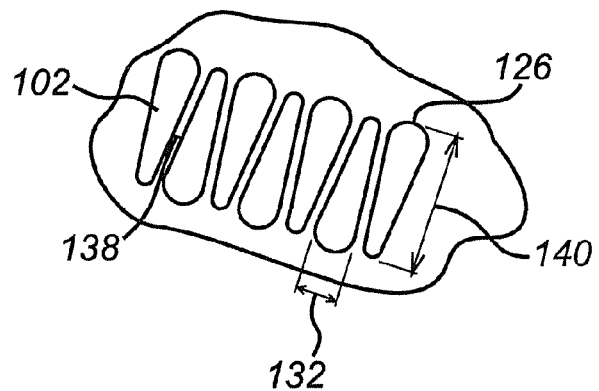

FIGS. 6(h)-(i) show arrangements wherein the longitudinal axes (26, 126) of all elongate apertures (2, 102) are parallel. FIG. 6(h) shows an embodiment wherein the elongate apertures (2) are straight-sided and have parallel sides. Arrows labelled 32 show the width of the elongate apertures of this embodiment. The width (32) of the elongate apertures (2) of this embodiment is the same along the entire length (40) of each elongate aperture (2). In addition, the widths (32) of all the elongate apertures (2) are the same. The elongate apertures (2) of this embodiment are arranged with the same distance (38) between an aperture and an adjacent aperture.

FIG. 6(i) shows an embodiment wherein the elongate apertures (102) are straight-sided and have non-parallel sides. Arrows labelled 132 show the maximum widths of the elongate apertures of this embodiment. The maximum widths (132) of all the elongate apertures (102) are the same. The elongate apertures (102) of this embodiment are arranged with the same distance (138) between an aperture and an adjacent aperture.

Figure 7A:
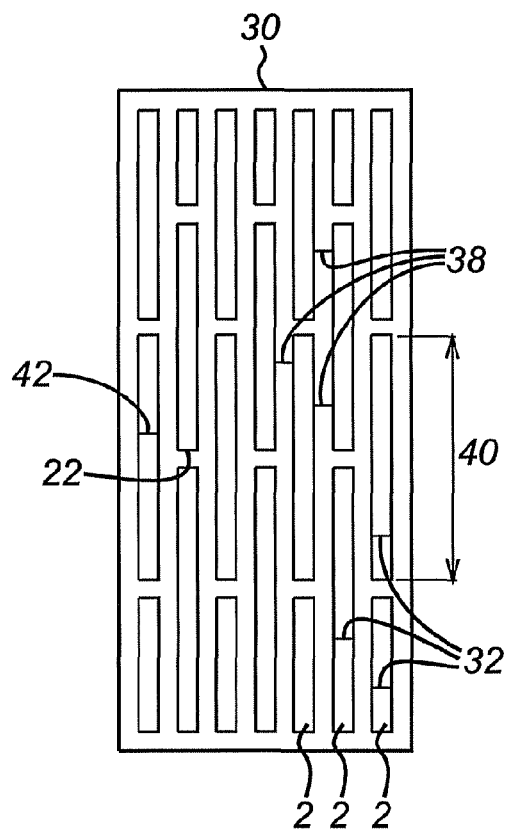
FIG. 7(a) shows a staggered arrangement of elongate apertures.

FIG. 7(a) depicts a staggered arrangement wherein adjacent elongate apertures (2) are staggered in such a way that the end (22) of an elongate aperture (2) is adjacent to the longitudinal centre (42) of the staggered adjacent elongate aperture (2). The elongate apertures (2) of this embodiment are straight-sided and have parallel sides. Arrows labelled 32 show the width of the elongate apertures of this embodiment. The width (32) of the elongate apertures (2) of this embodiment is the same along the entire length (40) of each elongate aperture (2). In addition, the widths (32) of all the elongate apertures (2) are the same. The elongate apertures (2) of this embodiment are arranged with the same distance (38) between an aperture and an adjacent aperture.

Figure 7B:
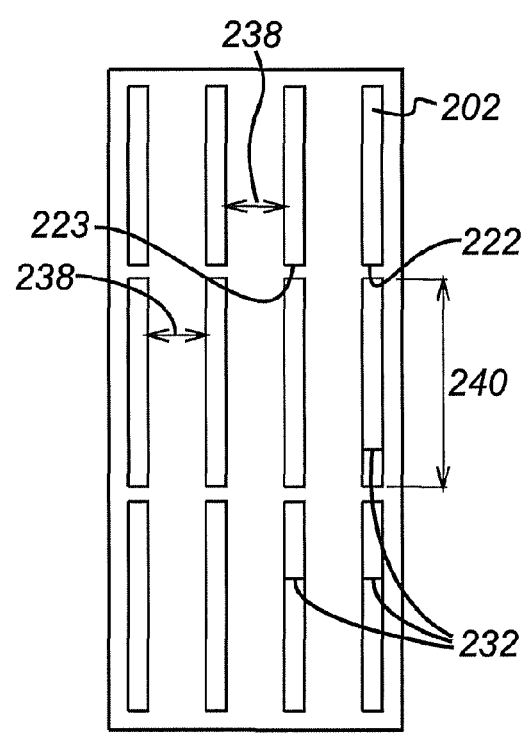
FIG. 7(b) shows a co-terminal arrangement of elongate apertures.

FIG. 7(b) depicts an arrangement wherein adjacent electrodes arranged in such a way that the end (222) of an elongate aperture (202) is co-terminal to the end (223) of the adjacent elongate aperture (202). The elongate apertures (202) of this embodiment are straight-sided and have parallel sides. Arrows labelled 232 show the width of the elongate apertures of this embodiment. The width (232) of the elongate apertures (202) of this embodiment is the same along the entire length (240) of each elongate aperture (2). In addition, the widths (232) of all the elongate apertures (202) are the same. The elongate apertures (202) of this embodiment are arranged with the same distance (238) between an aperture and an adjacent aperture.

FIG. 8 shows an embodiment wherein a PEM (43) is placed immediately adjacent to the back surface (8) of the diamond plate (4) of the present invention. The elongate apertures (2) of this embodiment are straight-sided and have parallel sides. Arrows labelled 32 show the width of the elongate apertures of this embodiment. The width (32) of the elongate apertures (2) of this embodiment is the same along the entire length (40) of each elongate aperture (2). In addition, the widths (32) of all the elongate apertures (2) are the same. The elongate apertures (2) of this embodiment are arranged with the same distance (38) between an aperture and an adjacent aperture. In addition, a further electrode (45) is placed on the other side of the PEM (43) to form a device comprising an electrode of the present invention, a PEM, and a further electrode.

FIG. 9 shows the partial construction of a forced flow configuration. In this embodiment, the diamond plate (4) is partially covered with a cover plate (44) such that the central portions of the elongate apertures (2) are covered and the ends of the elongate apertures (2) are uncovered. In this embodiment, one end of an elongate aperture (2) forms an inlet (46) and the other end forms an outlet (48). Consequently, in the embodiment of FIG. 9 there are a plurality of inlets (46) and outlets (48).

FIG. 10 shows the embodiment of FIG. 9 including an inlet manifold (50) and an outlet manifold (52). The inlet manifold (50) comprises a fluid inlet aperture (54) and the outlet manifold (52) comprises a fluid outlet aperture (56). The inlet manifold (50) covers the inlet end(s) (46) of the elongate aperture(s) (2) while the outlet manifold (52) covers the outlet end(s) (48) of the elongate aperture(s) (2).

Figure 11A:
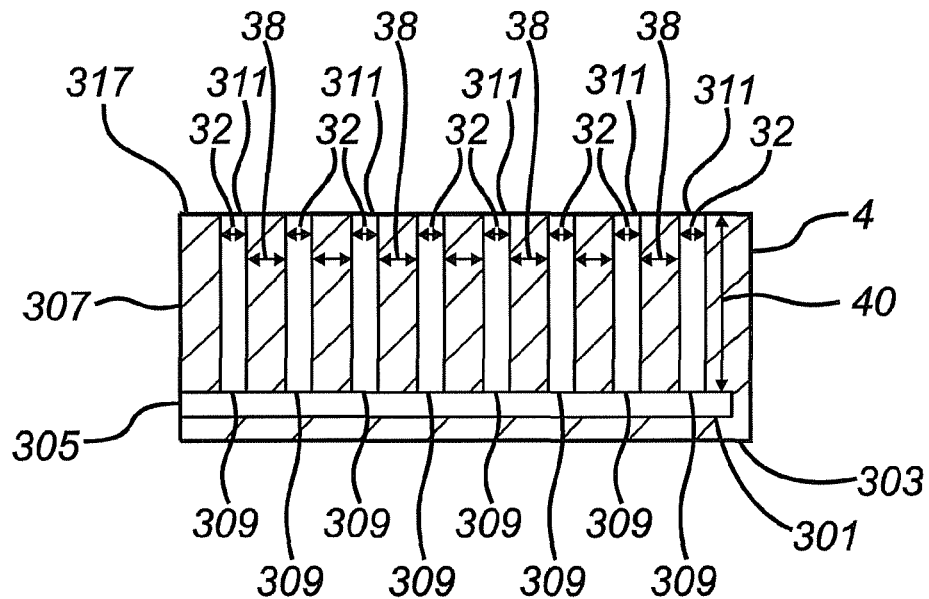
FIG. 11(a) shows an arrangement of elongate apertures with a main channel.
Figure 11B:
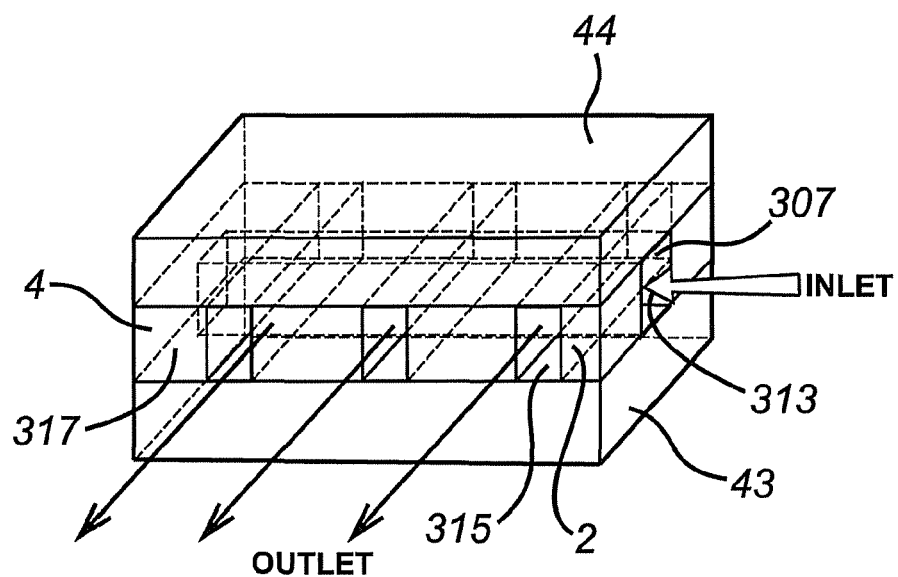
FIG. 11(b) shows the embodiment of FIG. 11(a) including a cover plate.

FIG. 11(*a*) shows a further embodiment of the diamond plate of the present invention. In this embodiment, a straight-sided main channel (301) is present in a rectangular diamond plate (4) closest to one side (303) of the diamond plate. One end (305) of the main channel (301) is cut across one side of the diamond plate (307). Eight elongate apertures (2) are present in this embodiment wherein one of the ends (309) of each aperture is in fluid contact with the main channel (301). The end (311) of each aperture that is not in contact with the main channel (301) is located at the side (317) of the diamond plate (4).

The apertures (2) of this embodiment are straight sided, the same length (40), parallel to each other and make a 90° angle with the main channel (301). The maximum spacing (38) between adjacent apertures is the same. The maximum width (32) of each aperture is the same.

FIG. 11(*b*) shows the embodiment of FIG. 11(*a*) with a cover plate (44) positioned such that the inlet (313) of the main channel (301) and the outlets (315) of the elongate apertures (2) are present at two of the sides (307, 317) of the diamond plate (4). The cover plate (44) substantially covers the surface of the diamond plate (4).

In addition, a PEM (43) is present immediately adjacent to the surface of the diamond plate (4) which is not covered with the cover plate (44). The PEM (43) substantially covers the surface of the diamond plate (4). In the forced flow configuration of this embodiment, water is pumped in through the main channel inlet and allowed to exit through the elongate aperture outlet(s), as shown in FIG. 11(*b*).

FIG. 12 shows an array of two diamond plate/PEM/further electrode devices positioned in opposing orientations and having a common diamond plate (4). The diamond plate (4) has four elongate apertures (2). One side of the diamond plate (4) is positioned next to a first PEM (43*a*), which is positioned adjacent a first cathode (45*a*). Thus, the first device comprises the first cathode (45*a*), the first PEM (43*a*) and the diamond plate (4).

The diamond plate (4) further has a second PEM (43*b*) positioned on the side opposite the first PEM (43*a*). The second PEM (43*b*) is smaller than the size of the diamond plate (4) such that it covers the central portions of the apertures (2) in the diamond plate (4). In this way, each aperture (2) has one end uncovered which forms an inlet (46) and a second end uncovered which forms an outlet (48). The second PEM (43*b*) has a second cathode (45*b*) positioned adjacent to the side of the second PEM (43*b*) opposite the diamond plate (4). Thus the second apparatus comprises the second cathode (45*b*), the second PEM (43*b*) and the diamond plate (4).

The array has a means (not shown) for providing forced flow of water to be processed (not shown) into the inlets (46) such that the water to be processed is forced into the elongate apertures (2) to form three phase interfaces with the diamond plate (4) and the first and second PEMs (43*a*, 43*b*). In this arrangement, there are three phase interfaces (not shown) on each side of the apertures (2), where the diamond plate (4) meets each of the first and second PEMs (43*a*, 43*b*). In this way, the rate of processing of the water is increased compared to processing of water in a single device.

FIG. 13 shows an array of two diamond plate/PEM/further electrode devices which are separated from each other but which are in opposing orientations. A first device has a first diamond plate (4*a*) having a plurality of elongate apertures (2*a*). One side of the first diamond plate (4*a*) is positioned next to a first PEM (43*a*), which is positioned adjacent a first cathode (45*a*).

Separated from the first device is a second diamond plate (4*b*) having a plurality of elongate apertures (not shown). One side of the second diamond plate (4*b*) is positioned next to a second PEM (43*b*). The second PEM (43*b*) has a second cathode (45*b*) positioned adjacent to the side of the second PEM (43*b*) opposite the second diamond plate (4*b*). Thus the second device is positioned in an opposite orientation to the first apparatus.

The array has means (not shown) for providing forced flow of water to be processed (72) between the first and second devices. The water to be processed (72) is forced to flow into the elongate apertures (not shown) to form three phase interfaces with the first diamond plate (4*a*) and first PEM (43*a*) and with the second diamond plate (4*b*) and the second PEM (43*b*). In this arrangement, there are three phase interfaces (not shown) within each aperture (2*a*) in each of the first and second diamond plates (4*a*, 4*b*) where the diamond plates meet each of the first and second PEMs (43*a*, 43*b*). In this way, the rate of processing of the water is increased compared to processing of water in a single apparatus.

Figure 14:
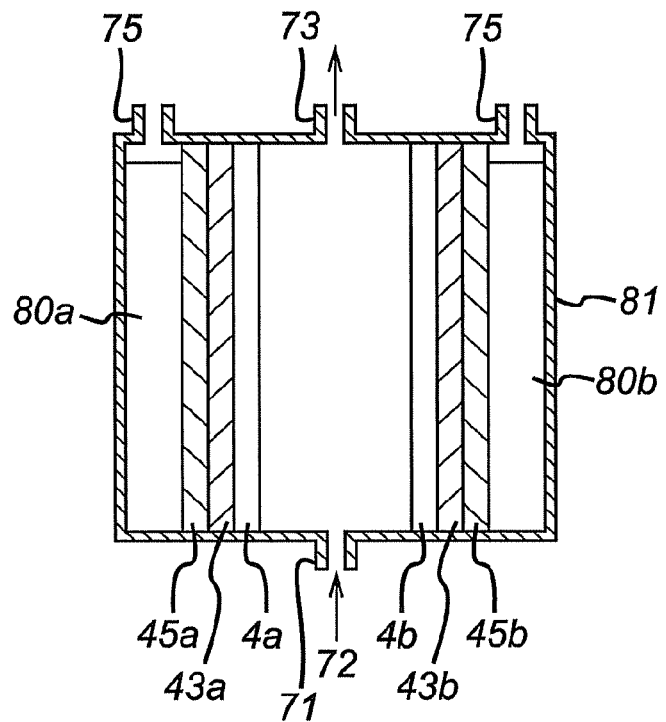
FIG. 14 shows an array of two diamond plate/PEM/further electrode devices in opposing orientations positioned within a reactor.

FIG. 14 shows an alternative array of two diamond plate/PEM/further electrode devices which are separated from each other but which are in opposing orientations. A first device has a first diamond plate (4*a*) having a plurality of elongate apertures (not shown). One side of the first diamond plate (4*a*) is positioned next to a first PEM (43*a*), which is positioned adjacent a first cathode (45*a*).

Separated from the first device is a second diamond plate (4*b*) having a plurality of elongate apertures (not shown). One side of the second diamond plate (4*b*) is positioned next to a second PEM (43*b*). The second PEM (43*b*) has a second cathode (45*b*) positioned adjacent to the side of the second PEM (43*b*) opposite the second diamond plate (4*b*). Thus the second device is positioned in an opposite orientation to the first device.

The first and second devices are contained within a reactor (81). The reactor has an inlet (71) for admitting water to be processed (72) and an outlet (73) for allowing the processed water to exit.

The first and second devices are arranged within the reactor so that water to be processed (72) is forced to flow in the region between the first and second diamond plates (4*a*, 4*b*) by pumping means (not shown). The water to be processed (72) is forced to flow into the elongate apertures (not shown) to form three phase interfaces with the first diamond plate (4*a*) and first PEM (43*a*) and with the second diamond plate (4*b*) and the second PEM (43*b*). In this arrangement, there are three phase interfaces (not shown) within each aperture (2*a*)

in each of the first and second diamond plates (4a, 4b) where the diamond plates meet each of the first and second PEMs (43a, 43b). In this way, the rate of processing of the water is increased compared to processing of water with a single device.

Water (80a, 80b) in which the counter reaction can occur is contained in the reactor adjacent to each of the first and second cathodes (45a, 45b). The water (80a, 80b) in which the counter reaction can occur is isolated from the water to be processed. The reactor has vents (75) which allow for release of hydrogen gas formed in the counter reaction water (80a, 80b) during the electrochemical reaction.

Figure 15:
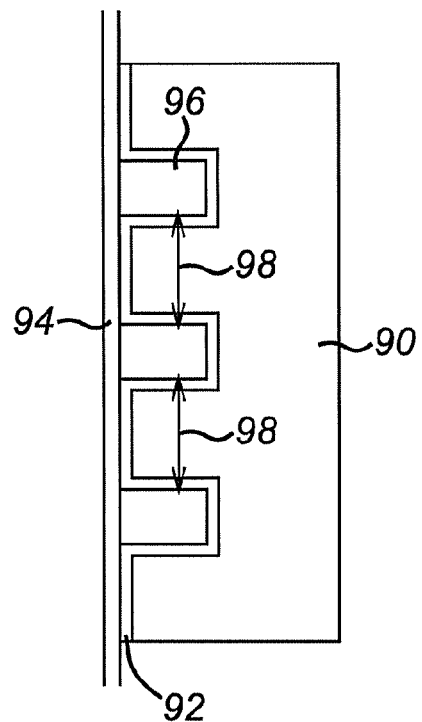
FIG. 15 shows an embodiment of an electrode comprising a diamond coated electrically conducting substrate and a PEM.

FIG. 15 shows an embodiment wherein an electrically conducting substrate (90) is coated with a layer of conductive CVD diamond (92). A PEM (94) is placed immediately adjacent the coated surface of the electrically conducting substrate. The elongate apertures (96) are straight-sided and have parallel sides. The elongate apertures (96) of this embodiment are arranged with the same distance (98) between an aperture and adjacent aperture.

The invention is further illustrated by the following examples. It will be appreciated that the examples are for illustrative purposes only and are not intended to limit the invention as described above. Modification of detail may be made without departing from the scope of the invention.

EXAMPLES

Example 1

An as-grown diamond plate of dimensions 50 mm×15 mm and thickness 0.5 mm was provided. 96 straight-sided elongate apertures with straight ends and widths of 0.2 mm and a spacing between apertures of 0.3 mm were cut through the entire thickness of the diamond plate into a working area of 48 mm×13 mm using a laser cutting technique from the nucleation surface of the plate. The elongate apertures were parallel to the longest edge of the diamond plate. The walls of the elongate apertures were tapered at an angle of approximately 4°. The aperture edge lengths measured with respect to the front and back surfaces of the diamond plate were very slightly different, being very slightly higher for the nucleation surface compared with the growth surface.

The nucleation surface of the diamond plate was mounted onto a PEM. For this diamond plate, the aperture edge length per unit working area of the diamond plate measured on the nucleation surface was found to be 4.06 mm/mm$^2$.

A further electrode of platinum gauze was mounted on the side of the PEM not attached to the diamond plate.

The device comprising the electrode of the present invention, the PEM and the further electrode was immersed in water and the electrode of the present invention was biased as the anode while the further electrode was biased as the cathode. A potential of from 5 to 8 Volts was applied across the electrode of the present invention and the further electrode. The initial rate of ozone production under these conditions was found to be approximately 200 mg/min.

Example 2

A device was prepared as described in Example 1.

The diamond plate was partially covered with a cover plate of polytetrafluoroethane such that the central portions of the elongate apertures were covered and the ends of the elongate apertures were uncovered. The distance from the edge of the cover plate to the end of an elongate aperture was about 1.5 mm.

An inlet manifold comprising one fluid inlet aperture and the outlet manifold comprising one fluid outlet aperture were provided. The inlet manifold covered the inlet ends of the elongate apertures while the outlet manifold covered the outlet ends of the elongate apertures.

The surface of the diamond plate immediately adjacent to the cover plate and the inlet and outlet manifolds was processed subsequent to the growth of the plate by lapping and polishing to have a surface roughness, $R_a$, of less than 1 μm. A seal was provided around the periphery of the diamond plate between the surface of the diamond plate and the cover plate, and between the surface of the diamond plate and the inlet and outlet manifolds to prevent leakage of the fluid.

Pressurised water was channelled through the elongate apertures in the region between the cover plate, the PEM and the elongate aperture walls in a forced flow configuration between the inlet ends and the outlet ends of the elongate apertures. The water flowed through the elongate apertures at an average total flow rate of 1000 cm$^3$/min. No bubble formation was observed when the potential was applied between the electrode of the present invention and the further electrode.

When the device was immersed in water with the electrode of the present invention biased as the anode and the further electrode biased as the cathode according to example 1, the initial rate of ozone production was found to be approximately 200 mg/min.

Comparative Example 1

A diamond plate of dimensions 50 mm×15 mm and thickness 0.5 mm was provided. 1470 circular apertures with diameters of 0.5 mm and a minimum separation between apertures of 0.2 mm were cut through the entire thickness of the diamond plate into a working area of 48 mm×13 mm using a laser cutting technique. The walls of the circular apertures were slightly tapered, being narrower at the growth surface than at the nucleation surface. The front and the back surfaces of the cut diamond plate were of the same area and the edge lengths measured with respect to the front and back surfaces of the diamond plate were identical.

The nucleation surface of the diamond plate was mounted onto a PEM of Nafion® film N117 (DuPont). The edge length per unit working area of the diamond plate, measured at the nucleation surface, was found to be 3.70 mm/mm$^2$.

A further electrode of platinum gauze was mounted on the side of the PEM not attached to the diamond plate.

The device was immersed in water and the electrode of this comparative example was biased as the anode while the further electrode was biased as the cathode. A potential of from 5 to 8 Volts was applied across the electrode of this comparative example and the further electrode. The initial rate of ozone production under these conditions was found to be about 15 mg/min.

The invention claimed is:

1. An electrode consisting essentially of an electrically conducting polycrystalline CVD diamond plate having a working area and comprising at least one elongate aperture in the working area, each elongate aperture having an aperture edge length, wherein the total aperture edge length for the elongate aperture(s) in the working area of the diamond plate is greater than about 4 mm/mm$^2$.

2. An electrode according to claim 1, wherein the diamond plate has a nucleation face and a growth face, wherein the growth face of the diamond plate is in an unprocessed form.

3. An electrode according to claim 2, wherein the nucleation face of the diamond plate is in an unprocessed form.

4. An electrode according to claim 1, wherein the diamond plate is partially covered with a cover plate such that the ends of the at least one elongate aperture are uncovered and wherein one end of the at least one elongate aperture forms an inlet for fluid and the other end forms an outlet for fluid.

5. An electrode according to claim 1, wherein the at least one elongate aperture has a maximum width of less than about 0.5 mm.

6. An electrode according to claim 1, wherein the elongate aperture is straight sided.

7. An electrode according to claim 6, wherein the straight sides of the elongate aperture are parallel.

8. An electrode according to claim 1 comprising two or more elongate apertures.

9. An electrode according to claim 8, wherein the maximum widths of the two or more elongate apertures are identical.

10. An electrode according to claim 8, wherein each elongate aperture is parallel to an adjacent elongate aperture.

11. An electrode according to claim 8, wherein the maximum spacing between adjacent elongate apertures is about 0.6 mm or less.

12. An electrode according to claim 8, wherein the elongate apertures are of an identical length.

13. An electrode according to claim 1, wherein the at least one elongate aperture is parallel to a side of the diamond plate.

14. An electrode according to claim 1, wherein the at least one elongate aperture comprises walls that extend through the diamond plate and wherein the walls are tapered through the thickness of the diamond plate.

15. An electrolysis cell comprising an electrode according to claim 1.

16. A method of treating water using an electrolysis cell according to claim 15.

* * * * *

UNITED STATES PATENT AND TRADEMARK OFFICE
CERTIFICATE OF CORRECTION

| | | |
|---|---|---|
| PATENT NO. | : 8,361,289 B2 | Page 1 of 1 |
| APPLICATION NO. | : 12/514055 | |
| DATED | : January 29, 2013 | |
| INVENTOR(S) | : Whitehead et al. | |

It is certified that error appears in the above-identified patent and that said Letters Patent is hereby corrected as shown below:

The Title page, Item no. (73), please insert --Electrolytic Ozone, Inc., Wilmington, MA (US)--.

Signed and Sealed this
Twelfth Day of March, 2013

Teresa Stanek Rea
*Acting Director of the United States Patent and Trademark Office*